Dec. 17, 1946.　　　L. W. SCHRADER　　　2,412,913
HIGH TEMPERATURE VALVE
Filed Sept. 17, 1943
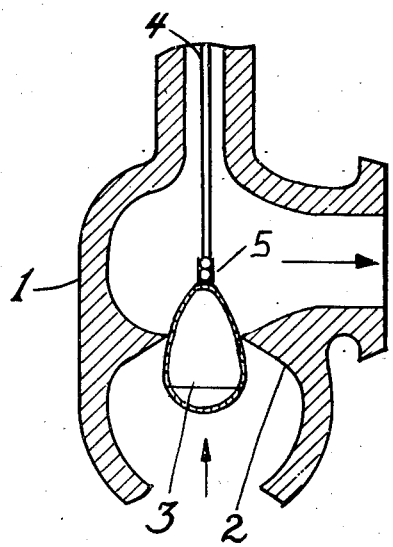
Leo W. Schrader Inventor
By _____ Attorney Patented Dec. 17, 1946

2,412,913

UNITED STATES PATENT OFFICE 2,412,913

HIGH-TEMPERATURE VALVE

Leo W. Schrader, Elizabeth, N. J., assignor to Standard Oil Development Company, a corporation of Delaware Application September 17, 1943, Serial No. 502,770

1 Claim. (Cl. 251—159)

This invention relates to valves and particularly to a high temperature plug valve in which seating is improved by internal pressure in a hollow plug.

An object of the invention is the provision of a valve with an expansible plug which is sensible to both temperature and pressure variations.

Another object of the invention is the provision of a plug valve which is reasonably proof against cracking and particularly such a valve suitable for high temperature operations by reason of its tight seating due to the deformable nature of the plug.

Another object of the invention is a plug valve in which the seating is improved by employing a relatively thin hollow plug with pressure on the inside, the pressure being responsive to temperature variations.

Other objects and advantages of the invention are believed apparent from the following description when taken in conjunction with the accompanying drawing. The drawing presents a sectional view of a preferred embodiment.

In this embodiment, numeral 1 indicates the valve body, numeral 2 the seat, numeral 3 the plug and numeral 4 the stem connection to outside control and numeral 5 the swivel joint. In this embodiment it is presumed that the valve is to function satisfactorily at temperatures of about 1400° F. Under such circumstances the valve parts, including the plug, are made of a heat resisting, non-corrosive alloy such as a material known as NCT3; that is, a ferrous alloy containing 25% chrome and 20% nickel or similar material. Under other operating conditions construction of the valve parts may be made of such materials as are suitable to meet the temperature and corrosive conditions provided there is in such material a measure of flexure and resistance to cracking. The plug 3 is hollow, the wall being of a thickness between $\frac{1}{32}$ and ½ inch. The shape may be almost spherical but preferably is egg-shaped. In fabrication enough solid carbon dioxide is placed in the plug so that during operation over the temperature range within which it is expected to function, the pressure inside the plug will exceed the pressure in the piping system in which the valve is operating, to maintain the shape of the plug, but will not exceed the strength of the shell of the plug.

The arrows in the diagram show the direction of flow in the piping system. When the valve is closed there will be a drop in pressure on the downstream side of the valve. The consequent increased differential between internal and external pressure on the downstream side of the plug shell will cause a slight expansion of the plug shell increasing the seating pressure of the plug to maintain tightness.

What is claimed is:

In a conduit adapted for flow of fluid under pressure at temperatures of about 1400° F. from a high pressure side to a low pressure side and having a valve seat across the conduit, a valve extending through said seat when in seated position, the valve comprising a hollow, thin-walled plug formed of a ferrous alloy containing chrome and nickel and the wall of said plug being of a thickness adapted to resist cracking at temperatures of about 1400° F., carbon dioxide in the plug in amounts sufficient to create such internal pressure at such high temperatures as will resist deformation of the plug by the conduit pressure but insufficient to rupture the wall of the plug at such temperatures, the plug seating against the high pressure side of the valve seat whereby release of pressure on the other side permits a tighter engagement on its seat.

LEO W. SCHRADER.